(12) United States Patent
Challal et al.

(10) Patent No.: US 8,186,750 B2
(45) Date of Patent: May 29, 2012

(54) AUTOMOBILE COMPRISING A CROSSBAR, A TECHNICAL FRONT SURFACE AND A CONVERGENT ELEMENT ATTACHED TO EACH OTHER

(75) Inventors: Hicham Challal, Versailles (FR); Mickael Flandin, Broue (FR)

(73) Assignee: Renault S.A.S., Boulogne-Billancourt (FR)

( * ) Notice: Subject to any disclaimer, the term of this patent is extended or adjusted under 35 U.S.C. 154(b) by 79 days.

(21) Appl. No.: 12/742,029

(22) PCT Filed: Nov. 6, 2008

(86) PCT No.: PCT/FR2008/052009
§ 371 (c)(1),
(2), (4) Date: Jul. 28, 2010

(87) PCT Pub. No.: WO2009/068794
PCT Pub. Date: Jun. 4, 2009

(65) Prior Publication Data
US 2010/0283289 A1 Nov. 11, 2010

(30) Foreign Application Priority Data
Nov. 8, 2007 (FR) ..................... 07 58888

(51) Int. Cl.
*B62D 25/08* (2006.01)
(52) U.S. Cl. ............. 296/193.09; 296/203.02; 293/133; 293/155
(58) Field of Classification Search .................. 293/133, 293/155; 296/193.09, 203.01, 203.02
See application file for complete search history.

(56) References Cited

U.S. PATENT DOCUMENTS

| 6,945,593 | B2 * | 9/2005 | Andre et al. ............. 296/187.09 |
| 7,303,219 | B2 * | 12/2007 | Trabant et al. ................. 293/155 |
| 2001/0045310 | A1 | 11/2001 | Ozawa et al. |
| 2005/0040672 | A1 | 2/2005 | Andre |
| 2008/0067838 | A1 | 3/2008 | Nakamae et al. |
| 2008/0100096 | A1 | 5/2008 | Andre |

FOREIGN PATENT DOCUMENTS

| EP | 1 142 776 | 10/2001 |
| EP | 1 506 907 | 2/2005 |
| EP | 1 698 520 | 9/2006 |
| EP | 1 902 928 | 3/2008 |
| WO | 2005 105552 | 11/2005 |

OTHER PUBLICATIONS

U.S. Appl. No. 13/145,797, filed Jul. 22, 2011, Challal, et al.

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

An automobile that includes: a lower crossbar including longitudinal arms connected by links to vehicle side rails located above the arms; a technical front surface defining a plate, the plate including an inner face and an outer face and being adapted to be attached to a structural member of the vehicle; a shield convergent element including two absorption members capable of absorbing by deformation thereof the energy of a shock to the vehicle; each longitudinal arm of the crossbar being attached by a first fastener to the inner surface of the plate; and each absorption member being attached by a second fastener to the outer face of the plate so that the two absorption members are capable of deformation along a longitudinal axis of the vehicle upon a shock; the inner surface including ribs.

9 Claims, 3 Drawing Sheets

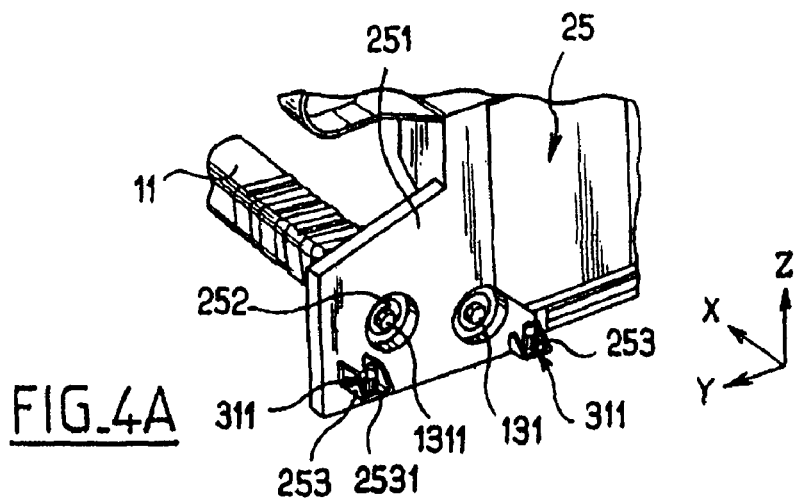
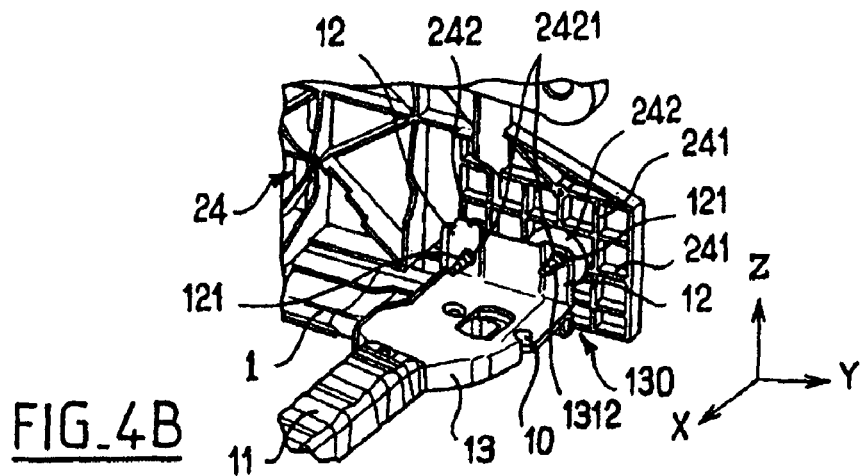
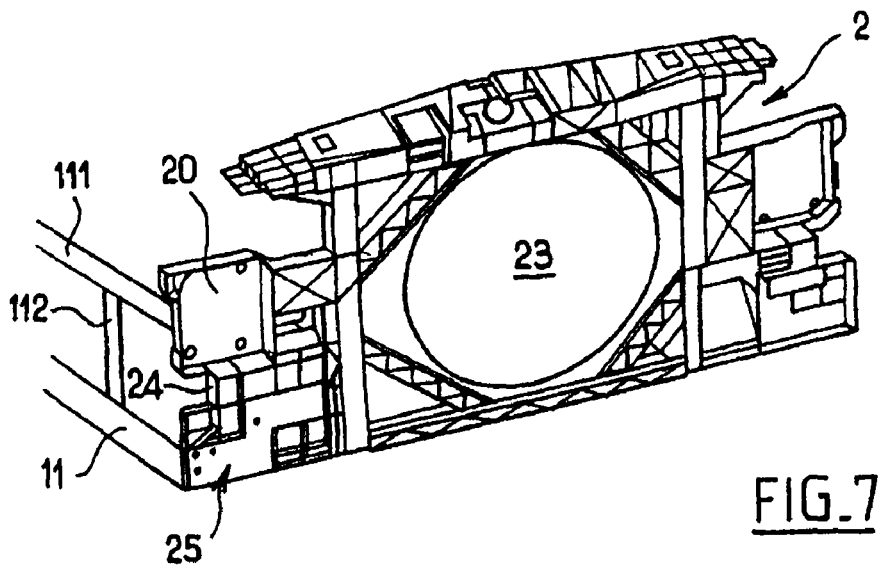

AUTOMOBILE COMPRISING A CROSSBAR, A TECHNICAL FRONT SURFACE AND A CONVERGENT ELEMENT ATTACHED TO EACH OTHER

OVERALL TECHNICAL FIELD

The present invention relates to a motor vehicle comprising a lower crossmember comprising longitudinal arms connected, by connections, to side rail members of the vehicle which are situated above said arms, a front end module that forms a panel, the panel having an interior face and an exterior face and being intended to be attached to a structural element of the vehicle, a front spoiler convergent comprising two energy-absorbing elements able, by deforming, to absorb the energy of an impact on the vehicle, each longitudinal arm of the crossmember being fixed by a first fastener to the interior face of the panel, and each energy-absorbing element being fixed by a second fastener to the exterior face of the panel, so that the two energy-absorbing elements can deform along a longitudinal axis of the vehicle in the event of an impact.

PRIOR ART

Figure 1:
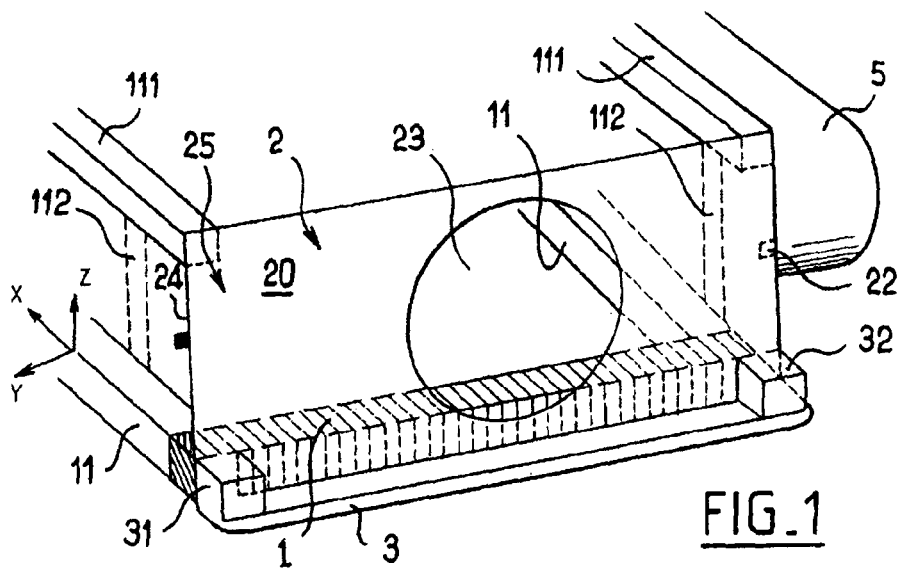

FIG. 1 is a very schematic depiction of a front part of a motor vehicle, comprising a lower crossmember 1, having longitudinal arms 11 connected to side rail members 111 of the vehicle, these being situated above said longitudinal arms, by connections 112. The crossmember 1 can be positioned under a radiator of the vehicle.

The vehicle also comprises a front end module 2 or "fem". The front end module is said to be "structural" because in this instance it forms an extensive front end module supporting cooling elements such as the radiator and its fan and/or the condenser for example.

In addition, the fem 2 provides the vehicle chassis with additional stiffness.

For that purpose, the fem 2 forms a panel 20 which may have at least one opening 23 in it.

The panel 20 has an interior face 24 and an exterior face 25. Fasteners 21 and 22 allow the panel 20 to be fastened to a structural element 5 of the vehicle.

The opening 23 is intended to support a radiator fan.

As FIG. 1 shows, the vehicle also comprises a reinforced lower spoiler convergent element 3, or front spoiler convergent, having two energy-absorbing elements 31 and 32 on its lateral parts.

Figure 2:
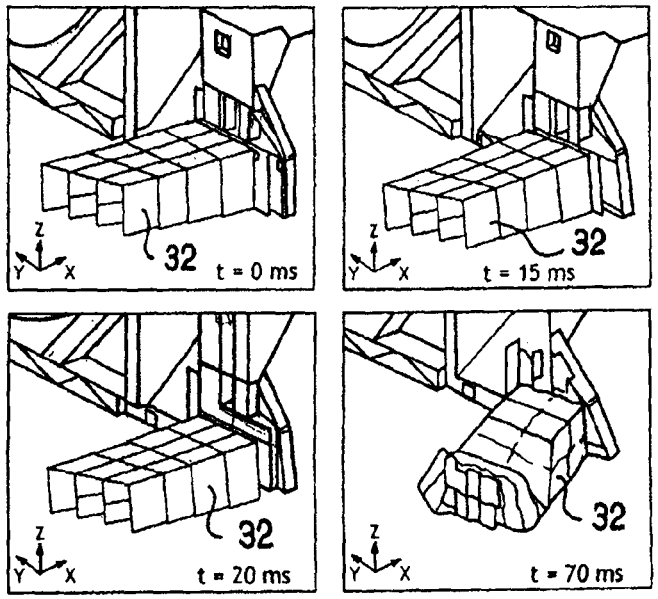

The energy-absorbing elements (often universally known by those skilled in the art by their English name of "crash boxes") are able, as shown schematically in FIG. 2, by deforming, to absorb the energy of an impact on the front end of the vehicle.

Furthermore, motor vehicles have to comply with the relevant standards in force. These standards make provision, amongst other things, for a "low-speed impact" (4/6 km/h), a "pedestrian impact" (40 km/h) on the lower structure (the lower structure comprises the crossmember, the front end module and the convergent) and a "intermediate speed impact" or "Danner impact" test at 9-16 km/h).

The lower structure has to transmit load in an impact and to absorb some of the energy, so as to minimize the deformation of the greatest possible number of components that make up the front end of the vehicle, such as the engine management system, the electrical components, or the lower crossmember supports for example.

However, the known lower structure depicted in FIG. 1 is unable satisfactorily to comply with the relevant standards, particularly as a result of the deformation of the energy-absorbing elements along the Z axis, as shown by FIG. 2. Such deformation along the Z-axis leads to damage to the components that make up the front end of the vehicle, particularly in the event of an intermediate speed impact.

For this reason, document EP 1 698 520 describes a motor vehicle, as described with reference to FIGS. 1 and 2, in which the energy-absorbing elements are produced in the form of crash boxes and are bolted to the panel such that the two energy-absorbing elements are able to deform along a longitudinal axis of the vehicle in the event of an impact.

However, such a configuration of the motor vehicle does not allow optimal deformation of the energy-absorbing elements along the longitudinal axis of the vehicle and may likewise lead to damage to the components in the event of an impact.

SUMMARY OF THE INVENTION

The invention sets out to remedy all of the abovementioned disadvantages.

To this end, the invention proposes a motor vehicle comprising a lower crossmember comprising longitudinal arms connected, by connections, to side rail members of the vehicle which are situated above said arms, a front end module that forms a panel, the panel having an interior face and an exterior face and being intended to be attached to a structural element of the vehicle, a front spoiler convergent comprising two energy-absorbing elements able, by deforming, to absorb the energy of an impact on the vehicle, each longitudinal arm of the crossmember being fixed by a first fastener to the interior face of the panel, and each energy-absorbing element being fixed by a second fastener to the exterior face of the panel, so that the two energy-absorbing elements can deform along a longitudinal axis of the vehicle in the event of an impact. The vehicle is characterized in that the interior face has ribs.

The invention is advantageously supplemented by the following features, considered alone or in any one of their technically feasible combinations:

- the interior face has at least one flat region with an orifice, the arm is fitted with a mounting plate that has a support comprising at least one flat region able to collaborate with the flat region of the interior face and also having an orifice, the vehicle further comprising at least one threaded fastener system comprising a bolt and a nut to form the first fastener, the first fastener keeping the interior face in close contact with the support by virtue of the bolt that passes through the orifices;
- the exterior face has a flat region comprising at least one flat-bottomed indentation corresponding to the flat region of the interior face, so that a head of the bolt is recessed with respect to the flat region of the exterior face;
- an axis of each threaded fastener system of the first fastener is a longitudinal axis of the vehicle;
- the exterior face comprises at least one flat region and at least one flat lug that has an orifice, each energy-absorbing element comprises a flat region able to collaborate with the flat region of the exterior face, and at least one fin able to collaborate with the lug and also having an orifice, the vehicle further comprising at least one threaded fastener system comprising a bolt and a nut to form the second fastener, the second fastener keeping the lug in close contact with the fin by virtue of the bolt that passes through the orifices and therefore keeping the exterior face in close contact with the energy-absorbing element;

an axis of each threaded fastener system of the second fastener is a vertical axis of the vehicle;

the first fastener and the second fastener incorporate no play;

the head of the bolt of the first fastener is placed in the flat region of the energy-absorbing element;

the deformation of the energy-absorbing elements is such that the vehicle complies with the relevant low-speed impact and medium-speed impact standards.

The invention has numerous advantages.

The front end module has satisfactory stiffness and thus ensures that the spoiler remains stable as it deforms.

Because the crossmember is secured to the front end module and each energy-absorbing element is secured to the front end module also, the two energy-absorbing elements are able to deform along a longitudinal axis of the vehicle in the event of an impact, rather than along a vertical axis of the vehicle. The deformation of the spoiler is thus satisfactory, making it possible to comply with the relevant standards regarding low-speed impacts and intermediate speed impacts, and also making it possible to avoid destruction, particularly of the crossmember, in an impact.

The ribs are positioned on the interior face of the panel, to prevent rib/rib contact between the exterior panel and the energy-absorbing element, thus allowing better deformation of the energy-absorbing element in the impact.

INTRODUCTION TO THE FIGURES

Figure 3:
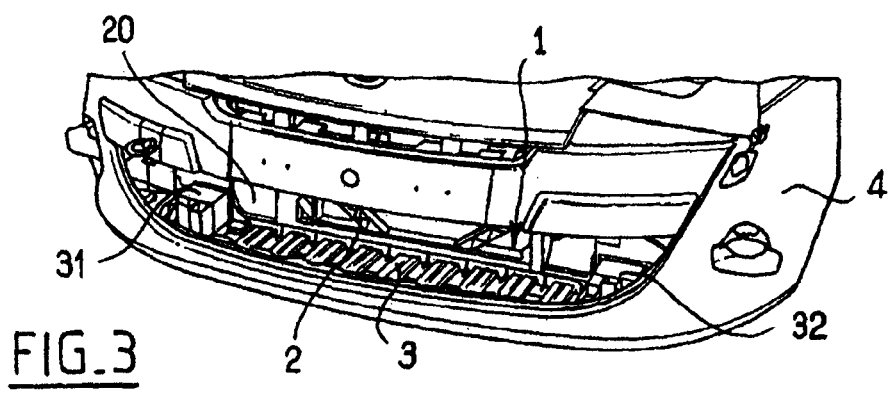
Figure 5A:
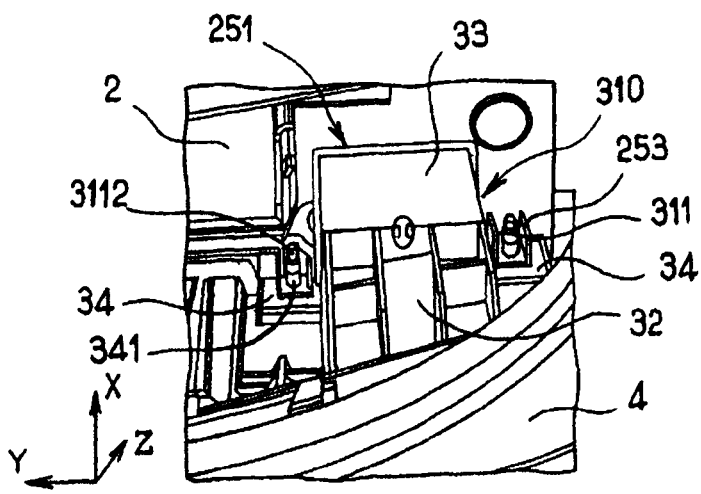
Figure 5B:
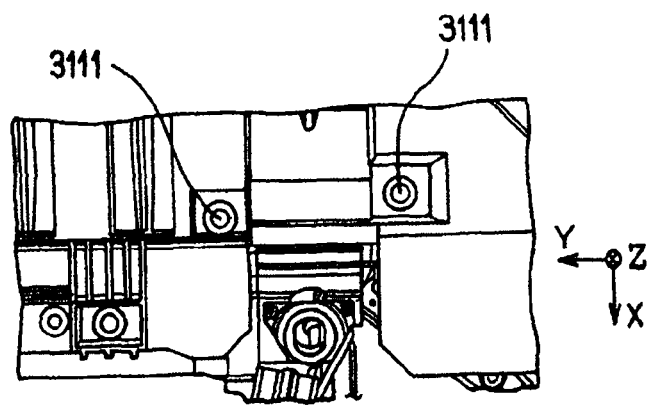
Figure 6:
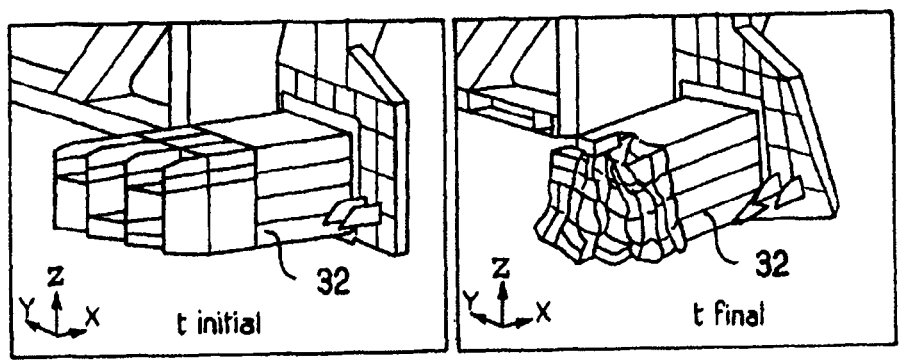

Other features, objects and advantages of the invention will become apparent from the description which follows, which is purely illustrative and nonlimiting, and which is to be read in conjunction with the attached drawings, in which:

FIG. 1, already mentioned, is a schematic perspective view of a front end module known from the prior art;

FIG. 2, already mentioned, schematically depicts the deformation of an energy-absorbing element that forms part of the convergent visible in FIG. 1 in an impact;

FIG. 3 is a schematic perspective view of the front end module of a vehicle according to the invention;

FIGS. 4A and 4B respectively are schematic front and rear perspective views of how the front end module according to the invention and the crossmember according to the invention are fastened together;

FIGS. 5A and 5B respectively are a schematic perspective front view and a view from beneath of how the fem according to the invention and the spoiler according to the invention are fastened together;

FIG. 6 schematically depicts the deformation of an energy-absorbing element according to the invention; and FIG. 7 is a schematic perspective view of a front end module according to the invention.

Across all the figures, elements that are similar bear identical numerical references.

DETAILED DESCRIPTION

FIGS. 3, 4A, 4B, 5A and 5B schematically show that a motor vehicle according to the invention mainly comprises a lower crossmember 1 that can support a radiator of the vehicle.

The vehicle also comprises an fem 2 forming a panel 20 that has at least one opening 23. The fem 2 is depicted more specifically in FIG. 7.

The panel 20 has an interior face 24 and an exterior face 25. Conventionally, the panel 20 is intended to be fastened to a structural element of the vehicle.

The opening 23 is conventionally intended to support a radiator fan.

The vehicle also comprises a convergent 3 which, on its lateral parts, has two energy-absorbing elements 31 and 32. The energy-absorbing elements 31 and 32 are able, by deforming, to absorb the energy of an impact on the vehicle. The energy absorbers 31 and 32 are formed as an integral part of the lateral part of the spoiler.

The convergent 3 is conventionally connected to a front spoiler 4 of the vehicle, as shown in FIG. 3.

According to the invention, and as shown more specifically in FIGS. 4A, 4B, 5A and 5B, the crossmember 1 is fastened to the fem 2 via longitudinal arms 11 by means of a mounting plate 13 held by a first fastener 130 on the interior face 24 of the panel 20. Each energy-absorbing element 31 or 32 is fastened by a second fastener 310 to the exterior face 25 of the panel 20.

Such fasteners 130 and 310 allow the assembly formed by the crossmember 1, the fem 2 and the convergent 3 to have a certain degree of stiffness, which stiffness allows the energy-absorbing elements 31 and 32 to deform along the longitudinal axis X of the vehicle in the event of an impact.

As FIGS. 4A and 4B more specifically show, the interior face 24 has ribs 241.

The ribs 241 more or less form a grid pattern, for example, and run at right angles to the interior face 24. The ribs 241 are preferably formed as an integral part on the interior face.

The interior face 24 does, however, have at least one flat region 242 that has at least one orifice 2421.

Moreover, the mounting plate 13 comprises a support 10 that has at least one flat region 12.

The flat region 12 is able to collaborate with the flat region 242 of the interior face 24 and also has an orifice 121.

The vehicle comprises at least one threaded fastener system 131 conventionally comprising a bolt 1311 and a nut 1312. Each threaded fastener system 131 thus forms the first fastener 130. The latter thus keeps the interior face 24 in close contact with the support 10, by virtue of the screw 1311 that passes through the orifices 2421 and 121 when the nut 1312 is tightened.

Like in any motor vehicle, there are constraints involved in fitting the crossmember, the fem and the convergent. In order to comply with these fitting constraints, the exterior face 25 has a flat region 251 that has at least one flat-bottomed indentation 252. The flat bottom corresponds to the flat region 242 of the interior face 24.

Thus, once fitted, a head of the bolt 1311 is recessed with respect to the flat region 251 of the exterior face 25. The spoiler can therefore then be fitted on the exterior face 25. Thus it will be noted on the figures that the head of the bolt 1311 of the first fastener is positioned in the flat region 33 of the energy-absorbing element 31 or 32, this being made possible by the indentation 252. The constraints on fitting are therefore met.

An axis of each threaded fastener system 131 of the first fastener 130 is a longitudinal axis X of the vehicle.

As shown more precisely by FIGS. 5A and 5B, the exterior face 25 comprises, in addition to the flat region 251, at least one flat lug 253 that has an orifice 2531. For preference, the lug 253 is formed as an integral part of the flat surface 251.

Each energy-absorbing element 31 or 32 for its part comprises at least one flat region 33 able to collaborate with the flat region 251 of the exterior face 25.

Each energy-absorbing element 31 or 32 also comprises at least one fin 34 able to collaborate with the lug 253 and likewise having an orifice 341. For preference, each fin 34 is formed as an integral part of the energy-absorbing element.

As previously, the vehicle comprises at least one threaded fastener system 311 conventionally comprising a bolt 3111 and a nut 3112, to form the second fastener 310. The latter holds the lug 253 in close contact with the fin 34 by virtue of the bolt 3111 passing through the orifices 2531 and 341 as the nut 3112 is tightened. As a result, the second fastener 310 keeps the exterior face 25 in close contact with the energy-absorbing element 31 or 32.

Each threaded fastener system 311 of the second fastener 310 preferably extends along a vertical axis Z of the vehicle.

As can be seen in the figures, each first fastener 130 comprises two threaded fastener systems 131 positioned centrally and each second fastener 310 likewise comprises two threaded fastener systems 311 positioned one on each side of the central threaded fastener systems 131.

Each fastener 131 or 310 incorporates no play, this being facilitated by the fact that contact between the elements that are to be fastened (that is to say the lower crossmember 1 and the fem 2, on the one hand, and the fem 2 and the spoiler 3 on the other) is achieved via surfaces 242, 12, 251 and 33 that are flat.

In addition, the ribs 241 are positioned on the interior face 24 of the panel 20 so as to avoid rib/rib contact between the exterior surface 25 and the energy-absorbing element 31 or 32, this being something that allows better deformation of the energy-absorbing element in the impact (see FIG. 6).

The invention claimed is:

1. A motor vehicle, comprising:
 a lower crossmember including longitudinal arms connected, by connections, to side rail members of the vehicle that are situated above the arms;
 a front end module that forms a panel, the panel including an interior face and an exterior face and configured to be attached to a structural element of the vehicle;
 a front spoiler including two energy-absorbing elements configured, by deforming, to absorb energy of an impact on the vehicle; and
 each of the longitudinal arms of the crossmember being fixed by a first fastener to the interior face of the panel, and each of the energy-absorbing elements being fixed by a second fastener to the exterior face of the panel, so that the two energy-absorbing elements can deform along a longitudinal axis of the vehicle in the event of an impact, wherein
 the interior face includes ribs and at least one flat region with an orifice,
 each of the longitudinal arms includes a mounting plate that includes a support including at least one flat region configured to collaborate with the flat region of the interior face and also including an orifice,
 the vehicle further comprises at least one threaded fastener system, including a bolt and a nut, to form the first fastener, the first fastener keeping the interior face in close contact with the support by virtue of the bolt that passes through the orifice in the interior face and the orifice in the mounting plate, and
 the exterior face includes a flat region including at least one flat-bottomed indentation corresponding to the flat region of the interior face, so that a head of the bolt is recessed with respect to the flat region of the exterior face.

2. The vehicle as claimed in claim 1, wherein an axis of each threaded fastener system of the first fastener is the longitudinal axis of the vehicle.

3. The vehicle as claimed in claim 1, wherein the exterior face includes the flat region and at least one flat lug extending from the flat region, the lug including an orifice,
 each of the energy-absorbing elements includes:
  a flat region configured to collaborate with the flat region of the exterior face, and
  at least one fin configured to collaborate with the lug and also including an orifice;
 the vehicle further comprising at least one threaded fastener system including a bolt and a nut to form the second fastener, the second fastener keeping the lug in close contact with the fin by virtue of the bolt that passes through the orifice of the lug and the orifice of the fin and therefore keeping the exterior face in close contact with one of the energy-absorbing elements.

4. The vehicle as claimed in claim 3, wherein an axis of each threaded fastener system of the second fastener is a vertical axis of the vehicle.

5. The vehicle as claimed in claim 1, wherein the first fastener and the second fastener incorporate no play.

6. The vehicle as claimed in claim 1, wherein the head of the bolt of the first fastener is placed in the flat region of one of the energy-absorbing elements.

7. The vehicle as claimed in claim 3, wherein the bolt of the at least one threaded fastener system that forms the second fastener does not pass through the orifice in the mounting plate of either of the longitudinal arms.

8. The vehicle as claimed in claim 3, wherein the bolt of the at least one threaded fastener system that forms the first fastener does not pass through the orifice in the lug of the exterior face.

9. The vehicle as claimed in claim 4, wherein an axis of each threaded fastener system of the first fastener is the longitudinal axis of the vehicle.

\* \* \* \* \*